Patented Nov. 30, 1943

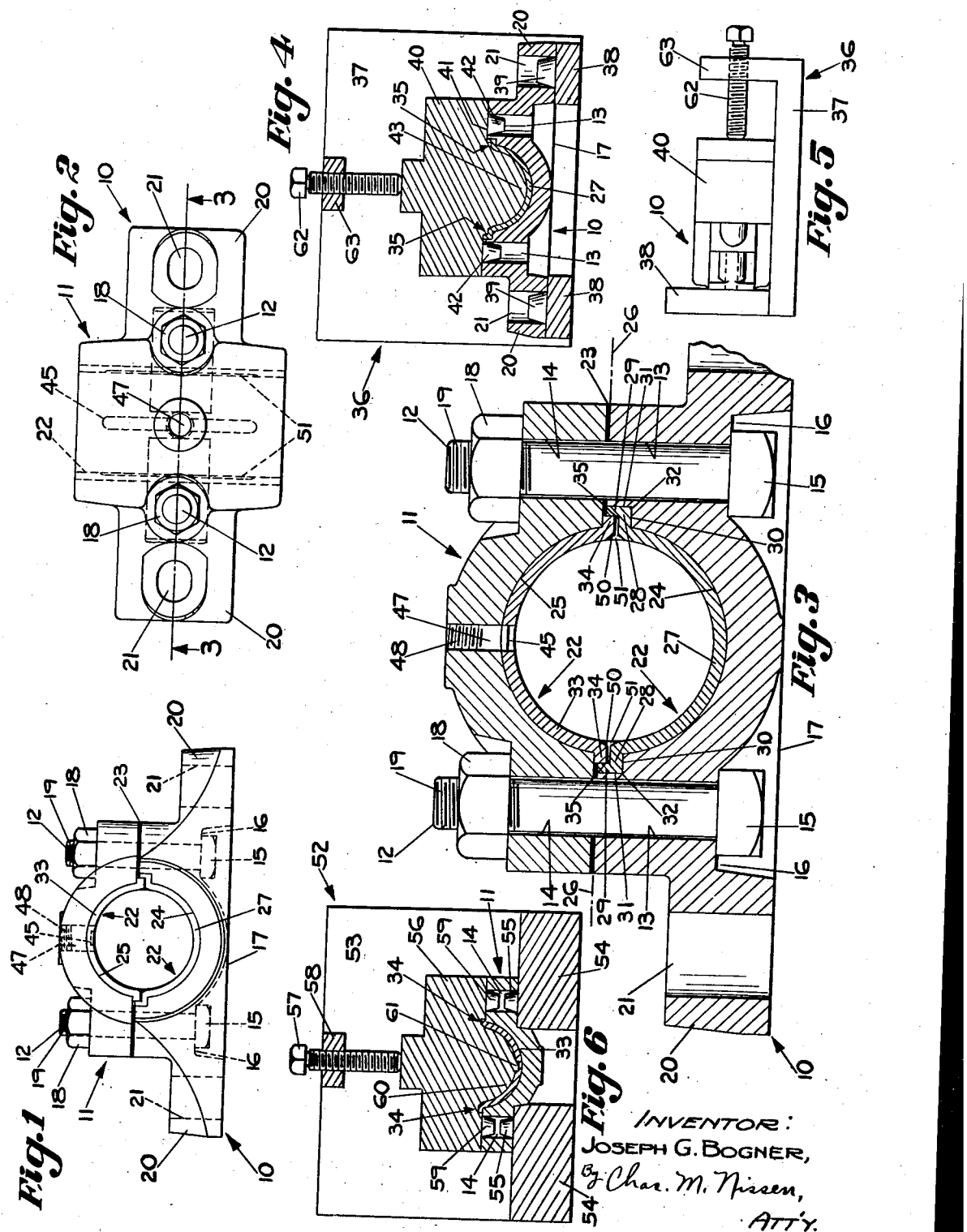

2,335,638

UNITED STATES PATENT OFFICE 2,335,638

JOURNAL BEARING

Joseph G. Bogner, Worthington, Ohio, assignor to The Jeffrey Manufacturing Company, a corporation of Ohio Application January 10, 1941, Serial No. 373,989

6 Claims. (Cl. 308—74)

My invention relates to journal bearings, and one of its objects is to reduce the cost of construction by the provision of a new and improved journal bearing.

Another object of the invention is to provide a journal bearing having a bearing metal lining which can be inserted in a rough recess of the housing and by a single operation provide a finished bore for a bearing fit on a shaft.

Another object of the invention is to provide a two part bearing generally called the "split type" in which the lining has smooth guide surfaces to maintain alignment of the parts whtile permitting relative adjustment without resorting to machining.

Other objects of the invention will appear hereinafter, the novel features and combinations being pointed out in the claims hereto appended.

In the accompanying drawing,

Fig. 1 is an end view of an assembled journal bearing;

Fig. 2 is a plan view of the bearing shown in Fig. 1;

Fig. 3 is a sectional view taken on the line 3—3 of Fig. 2 looking in the direction of the arrows;

Fig. 4 is a sectional view of the base of one of the bearings in a fixture which also holds a die or lining forming device;

Fig. 5 is a side view of the fixture and bearing shown in Fig. 4; and

Fig. 6 is a sectional view of the cap of one of the bearings in a fixture which also holds a die or lining forming device.

Referring to the drawing it will be seen that the bearing of my invention comprises a base portion 10 and a cap portion 11.

The two portions 10 and 11 forming a housing are held together by bolts 12 which extend through apertures 13 of the base 10 and apertures 14 of the cap 11, said apertures being in alignment when the base 10 and cap 11 are assembled. The heads 15 of the bolts 12 fit into pockets 16 formed in the bottom of the base 10 and said pockets are of such shape and size that each bolt head 15 will not project below the bottom surface 17 of the base and at least one face of the bolt head 15 will engage a side wall of the pocket 16 and thereby prevent turning of the bolt 12. The bolt heads 15 are herein shown as being square but any other shape of head may be substituted. Nuts 18 adapted to fit the screw thread ends 19 of the bolts 12 are utilized to clamp the base 10 and 11 together.

The base 10 is provided with ears 20 extending from each side thereof and each having an aperture 21 through which a bolt, not shown, may be extended for fixing the journal bearing to its support. As herein shown the cap 11 is held on the base 10 and the bearing fixed to its support by only two bolts but in larger and longer bearings it may be desirable to use four bolts for each purpose.

My journal bearing utilizes a new and improved type of soft metal lining generally indicated at 22 which requires a minimum amount of machining of either the bearing housing or the lining. A two part or split bearing is commonly used wherein the base and cap may be brought closer together to compensate for wear of the lining. Shims, such as indicated at 23, are used to space the two parts 10 and 11 a sufficient amount to provide a running fit on the shaft when the bearing lining 22 is new and when the metal of the lining 22 wears away the cap 11 is removed and a sufficient number of shims 23 removed to again provide a close running fit on the shaft.

To relay on the bolts 12 alone to maintain proper alignment of the two parts 10 and 11 would require the use of at least four finished bolts and finished apertures 13 and 14, making the bearing of very costly construction. In my invention the base 10 and cap 11 are preferably made of cast metal with the semi-cylindrical recess 24 of the base and semi-cylindrical recess 25 of the cap and the pockets 16 of the base 10 formed when casting. The apertures 13, 14 and 21 are preferably formed when casting for relatively loose fit of the bolts. In the manufacture of the bearing it is necessary only to grind the bottom surface 17 of the base 10 and the split line 26 of both base 10 and cap 11 and each end of the assembled hub if the bearing is to be used between rotating parts.

The lining 22 comprises two parts 27 and 33. Lining 27 is fitted into the base 10 and has oppositely disposed radially and longitudinally extending projections 28 terminating in right angle flanges 29 formed to fit the shoulders 30 and 31 respectively of the grooves generally indicated at 32 in the semi-cylindrical recess 24 of the base 10.

Of particular importance is the fact that the inner faces of the flanges 29 are substantially parallel to cooperate with the radial projections 34 on the lining 33 as hereinafter described, to act as guides between the two halves 10 and 11 of my bearing. As hereinafter described these parallel surfaces are formed by a die 40 and therefore eliminate any machining to form guide means to insure proper alignment of the two halves 10 and 11 of said bearing.

The lining 33 for the cap 11 is provided with oppositely disposed radially and longitudinally extending projections 34 which, when the base 10 and cap 11 are assembled, project into a groove 35 formed by the projections 28 and right angle flanges 29, with the outer surfaces of the projections 34 parallel and in contact with the inner guiding faces of the flanges 29 to cooperate therewith to effect the guiding action above described. The grooves 35 extend longitudinally continuously along the edges of the lining 27 adjacent the plane splitting the base 10 and cap 11 and from one end of said base 10 and lining 27 to the other. When the lining 22 is new, several shims 23 are placed between the ground surfaces 26 of the base 10 and cap 11, each of the shims 23 having apertures for the bolts 12, and the nuts 18 are drawn down to clamp the two parts of the bearing together without actually clamping the lining 22 on the shaft. As above described shims 23 may be removed and the two parts of the bearing reassembled to compensate for wear of the lining 22.

Referring to Fig. 3 it will be noted that the cap 11 may be moved radially or vertically an appreciable distance without causing the projections 34 of the top lining 33 to become out of engagement with the flanges 29 of the bottom lining 27. The engagement of the cooperating surfaces of the projections 34 and flanges 29 therefore maintain proper alignment of the two parts 10 and 11 of the bearing as they are adjusted radially relative to each other and even though a variable number of shims 23 are necessary to provide a running fit on the shaft. The guiding surfaces also provide for relative axial adjustment of the two parts 10 and 11.

In this invention it is evident that the abutting guiding faces are formed on the soft metal lining 22 without the necessity for machining.

Referring to Fig. 4 there is shown a cradle or holder 36 which may be used as hereinafter described to form the lining 22 in the bearing, said lining having the smooth faces on parts 29 and 34 which require no machining. The cradle 36 comprises a base plate 37 provided at one end with the upstanding ears 38 having aligning studs 39. The base 10 is placed in the cradle 36 with the studs 39 extending into the apertures 21 and then a die or the like 40 having a surface 41 adapted to contact the surface 26 of the split line is moved into position against the base 10 with tapered studs 42 on the die 40 extending into the apertures 13 so as to clamp the die 40 to the base 10. The screw 62 extending through a screw threaded aperture of the ear 63 may be operated to effect said clamping action. The projection 43 of the die 40 is shaped to form the bore of the lining and the offset groove 35. After the die 40 and the base 10 are clamped together liquid babbitt is poured into the space between the parts. The base plate 37 is ground and polished or may be covered with a thin sheet of asbestos to prevent the hot Babbitt metal from adhering thereto. Sufficient babbitt is poured to allow a surplus on top which is wiped off while molten thereby leaving both ends of the bearing finished.

In Fig. 6 is shown the cradle 52 for holding the cap 11 for the babbitting operation. This device comprises a base 53 provided at one end with the upstanding ears 54 having aligning studs 55. The cap 11 is placed in the cradle 52 with the studs 55 extending into the apertures 14 of the cap and then the die 56 is moved by the screw 57, which is extended through a screw threaded aperture of the ear 58, until the studs 59 enter the apertures 14 from the opposite face of the cap 11. The face 60 of the die 56 is shaped to form the inner surface of the lining 33 including the projections 34. As above described the liquid babbitt is poured into the space between the die 56 and cap 11 to form the lining.

Grease groove 45 in the top half of the lining 33 may be formed by providing a projection 61 on the die 56 for the cap 11. This may be of any width or length and should be in communication with the grease hole 47 which is threaded as indicated at 48 for a grease cup not shown. The meeting edges of the linings may be chamfered as at 50 to cooperate with the space 51 to form additional grease grooves. As shown in Fig. 2 these grease grooves 45 and 51 do not extend to the ends of the hub, thereby retaining the lubricant within the length of the bearing surface.

After the parts of the bearings have been lined with bearing metal they are clamped together by the bolts 12, the projections 34 opposed to the flanges 29, with shims 23 between the two parts and the assembled bearing is broached to provide a smooth bore.

The elimination of many machining operations as has heretofore been necessary produces a greatly reduced cost of bearing.

Other devices may be used to hold the caps and the bases of the bearings with respect to the dies while pouring the molten bearing metal.

The bearing metal herein referred to as babbitt may be any kind or class of metal suitable for forming bearing surfaces that will melt at relatively low temperatures and may or may not be formed as described.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention what I desire to secure by Letters Patent of the United States is:

1. In a journal bearing, the combination with a split housing having a substantially central opening therethrough, of a pair of grooves in said housing adjacent the split plane thereof, and a two part metal lining for said opening, each of said lining parts having projections extending into said grooves and right angle flanges on the projections of one of said lining parts cooperating with the projections of the other lining part to maintain alignment of said base and cap while permitting relative radial adjustment.

2. A journal bearing comprising separable portions and a Babbitt bearing lining formed in two parts, one lining part having along each of its two longitudinal edges a groove providing a guiding surface, said other lining part having along each of its longitudinal edges a radial projection also providing a guiding surface, the guiding surfaces of said two parts being so constructed and arranged as to maintain said two bearing lining parts in alignment as they are adjusted toward and from each other.

3. A journal bearing comprising separable portions and a Babbitt bearing lining formed in two parts, one of said lining parts having along each of its two longitudinal edges a radially extending projection terminating in a right angle flange forming a groove, the inner faces of the two flanges being substantially parallel to form guides, the other lining part having along each edge a radially extending projection with an outer bearing surface, the bearing surfaces on said radial projections of said other lining being substantially parallel and also being constructed and arranged to cooperate with the inner faces of the flanges of said one lining part so as to maintain said two bearing lining parts in alignment as they are adjusted toward and from each other.

4. A split journal bearing comprising two complementary members cooperating to provide a generally cylindrical bearing metal receiving opening split substantially along a diameter of said cylindrical opening, a separate Babbitt bearing metal lining attached to each of said members, one of said linings having grooves extending longitudinally and on opposite edges thereof and adjacent the split plane of said members, said grooves having substantially parallel longitudinally extending guiding surfaces on opposite sides thereof, one in each groove, the lining of said other member having projections on opposite sides which extend below the split plane of said bearing and into said grooves, said projections having guiding surfaces which cooperate with the guiding surfaces of said grooves to maintain said two complementary members in proper alignment as they are adjusted radially toward and from each other.

5. A split journal bearing comprising two complementary members cooperating to provide a generally cylindrical bearing metal receiving opening split substantially along a diameter of said cylindrical opening, a Babbitt bearing lining at least for one of said members, the other of said members having grooves extending longitudinally and on opposite edges thereof and adjacent the split plane of said members, the lining of said one member having projections on opposite sides which extend beyond the split plane of said members and into said grooves and having guiding surfaces formed thereon to maintain said two complementary members in proper alignment during radial adjustment thereof relative to one another.

6. A split journal bearing comprising a pair of complementary members each having a separate Babbitt bearing lining, said members being split substantially along a diameter, one of said members having a groove extending longitudinally along one edge adjacent the split plane, the bearing lining of said one member extending into said groove and providing a guiding surface, the bearing lining of the other of said members having a part extending into said groove and having a guiding surface cooperating with said first named guiding surface to aid in maintaining said complementary members in proper alignment as they are moved radially toward and from each other.

JOSEPH G. BOGNER.